United States Patent
Derryberry et al.

(10) Patent No.: US 6,728,307 B1
(45) Date of Patent: Apr. 27, 2004

(54) ADAPTIVE ANTENNA TRANSMIT ARRAY WITH REDUCED CDMA PILOT CHANNEL SET

(75) Inventors: R. Thomas Derryberry, Plano, TX (US); Balaji Raghothaman, Irving, TX (US)

(73) Assignee: Nokia Mobile Phones Ltd, Espoo (FI)

( * ) Notice: Subject to any disclaimer, the term of this patent is extended or adjusted under 35 U.S.C. 154(b) by 0 days.

(21) Appl. No.: 09/568,232

(22) Filed: May 5, 2000

Related U.S. Application Data

(60) Provisional application No. 60/153,600, filed on Sep. 13, 1999.

(51) Int. Cl.[7] .................................................. H04L 5/16
(52) U.S. Cl. ....................... 375/219; 375/260; 375/267; 375/340; 370/282; 370/465; 455/78; 455/88; 455/101; 455/103; 455/138; 455/279.1
(58) Field of Search ................................. 375/141, 143, 375/152, 219, 220, 260, 267, 269, 316, 340, 343, 347, 349; 370/277, 282, 465; 455/73, 78, 88, 89, 101, 103, 126, 137, 138, 279.1

(56) References Cited

U.S. PATENT DOCUMENTS

| | | | | |
|---|---|---|---|---|
| 5,781,845 A | * | 7/1998 | Dybdal et al. | 455/65 |
| 6,067,324 A | * | 5/2000 | Harrison | 375/267 |
| 6,122,260 A | * | 9/2000 | Liu et al. | 370/280 |

* cited by examiner

*Primary Examiner*—Stephen Chin
*Assistant Examiner*—Dac V. Ha
(74) *Attorney, Agent, or Firm*—Brian T. Rivers

(57) ABSTRACT

An adaptive transmit antenna array having a reduced pilot set is disclosed. The adaptive transmit antenna array utilizes a decision-directed mechanism for the estimation of maximal ratio combining (MRC) weights to be used at a receiver rather than requiring a user-specific pilot to provide estimation information.

13 Claims, 2 Drawing Sheets

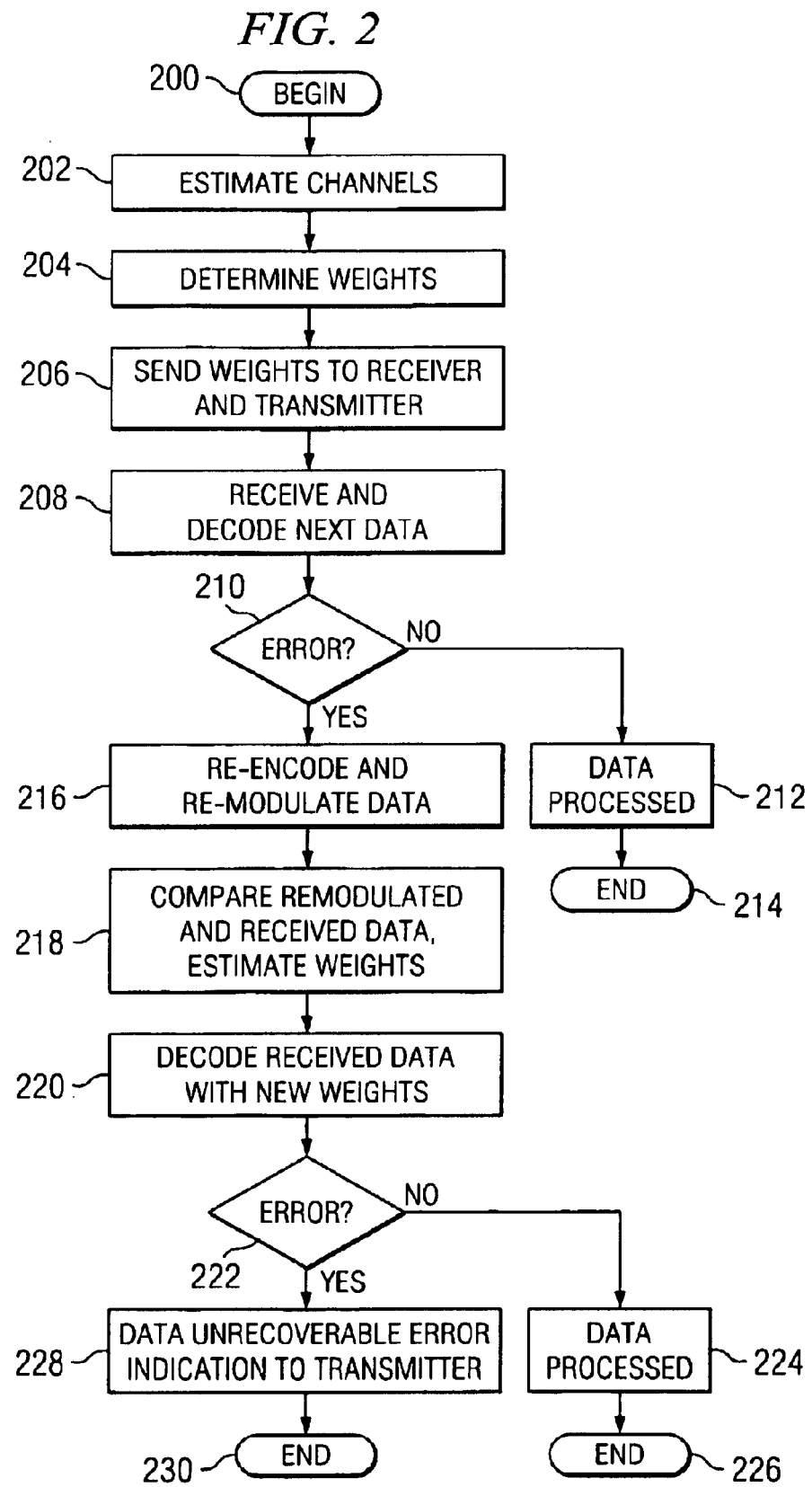

ADAPTIVE ANTENNA TRANSMIT ARRAY WITH REDUCED CDMA PILOT CHANNEL SET

CLAIM OF PRIORITY FROM A COPENDING PROVISIONAL PATENT APPLICATION

Priority is herewith claimed under 35 U.S.C. §119(e) from copending Provisional Patent Application 60/153,600, filed Sep. 13, 1999, entitled "Adaptive Arrays with Reduced Pilot Set: Demodulation Using PC Bits and Using Decision Directed Method," by R. Thomas Derryberry and Balaji Raghothaman. The disclosure of this Provisional Patent Application is incorporated by reference herein in its entirety.

FIELD OF THE INVENTION

This invention relates to transmit diversity in telecommunication systems and, more particularly, to a method and apparatus for transmitting on adaptive antenna transmit arrays using a reduced number of CDMA pilot channels.

BACKGROUND OF THE INVENTION

As wireless communication systems evolve, wireless system design has become increasingly demanding in relation to equipment and performance requirements. Future wireless systems, which will be third and fourth generation systems compared to the first generation analog and second generation digital systems currently in use, will be-required to provide high quality high transmission rate data services in addition to high quality voice services. Concurrent with these system service performance requirements will be equipment design constraints, which will strongly impact the design of mobile stations. The third and fourth generation wireless mobile stations will be required to be smaller, lighter, and more power-efficient units that are also capable of providing the sophisticated voice and data services of these future wireless systems.

Time-varying multi-path fading is an effect in wireless systems, whereby a transmitted signal propagates along multiple paths to a receiver causing fading of the received signal due to the constructive and destructive summing of the signals at the receiver. Several methods are known for overcoming the effects of multi-path fading, such as time interleaving with error-correction coding, implementing frequency diversity by utilizing spread spectrum techniques, or transmitter power control techniques. Each of these techniques, however, has drawbacks with regard to use for third and fourth generation wireless systems. Time interleaving may introduce unnecessary delay, spread spectrum techniques may require large bandwidth allocation to overcome a large coherence bandwidth, and power control techniques may require higher transmitter power than is desirable or sophisticated receiver-to-transmitter feedback techniques that increase mobile station (MS) complexity. All these drawbacks have negative impact on achieving the desired characteristics for third and fourth generation mobile stations.

Antenna diversity is another technique for overcoming the effects of multi-path fading in wireless systems. In diversity reception, two or more physically separated antennas are used to receive a signal, which is then processed through combining and switching to generate a received signal. A drawback of diversity reception is that the physical separation required between antennas may make diversity reception impractical for use on the forward link in the new wireless systems where small MS size is desired. A second technique for implementing antenna diversity is transmit diversity. In transmit diversity, a signal is transmitted from two or more antennas and then processed at the receiver by using maximum likelihood sequence estimator (MLSE) or minimum mean square error (MMSE) techniques. Transmit diversity has more practical application to the forward link in wireless systems in that it is easier to implement multiple antennas in the base station than in the MS.

One method of transmit diversity, called the Switched Transmit Diversity, proposes transmission using the best antenna at any given instant. Another method, called Orthogonal Transmit Diversity (OTD), splits the data stream into multiple streams and transmits the data using orthogonal CDMA codes.

Transmit diversity techniques have been shown to provide advantages over single-antenna systems in CDMA forward link transmission. Transmit diversity using open-loop and closed-loop methods have been considered, and closed-loop methods in general have been shown to be preferred. In open-loop methods, transmitter parameters are adjusted without feedback from the receiver. This may involve, for example, adjusting transmitter parameters on the forward link based on measurements made on signals received on the reverse link. In closed-loop methods, feedback information from the receiver is used to adjust transmitter parameters. Several closed-loop methods for transmit diversity have been proposed, such as space time diversity, orthogonal transmit diversity (OTD), and time space transmit diversity (TSTD) and transmit adaptive arrays (TX AA). In TX AA, transmission parameters of multiple antennas are weighted in such a way that the power received by the mobile is maximized. For a single path channel, the optimal weights for the antennas are the conjugates of the respective channel coefficients. For multipath channel conditions, each antenna would optimally have multiple filter tap weights. It has been shown that using one tap weight per antenna even in this case provides better performance than the single antenna configuration. Implementation of TX AA is a trade-off that results in a reduction of reverse link capacity in order to facilitate an increase in forward link capacity. TX AA using two transmit antennas requires three forward link pilots: (1) a broadcast common pilot ($Pilot_0$), (2) a broadcast auxiliary pilot (Aux $Pilot_1$) for the second antenna, and (3) a dedicated auxiliary pilot (Aux $Pilot_u$) for each user.

In TX AA with a dedicated auxiliary pilot, Aux $Pilot_u$, for each user, the traffic channels (TCHs), along with each user auxiliary pilot, Aux $Pilot_u$, are transmitted through the two antennas after appropriate weighting. The TX AA weights in the ideal case are the conjugates of the channel coefficients $h_0(t)$ and $h_1(t)$. These channel coefficients are estimated by the MS by using matched filters on the received antenna pilot signals ($Pilot_0$ and Aux $Pilot_1$). A quantized ratio of the channel coefficients is fed back to the base station. This ratio is a complex number, with gain and phase information. The phase is allotted a larger number of bits of quantization than the gain. Some modes of TX AA use a phase-only feedback method.

Both the traffic channel signal and the user specific auxiliary pilot, Aux $Pilot_u$, are altered by the TX AA weights and also the transmission channel before they are received at the MS. For coherent demodulation of the TCH, information on both the TX AA weights and transmission channel are necessary for each antenna path. The TX AA weights are actually calculated at the MS, so ideally that information should be available to the MS. In reality, however, there is a bit error rate associated with the feedback, which means that the TX AA weighting applied at the base station is not always the same as that calculated at the MS. The Aux Pilot$_u$ is thus utilized in order to obtain an estimate of the exact gain and phase change that was undergone by the TCH, since Aux Pilot$_u$ undergoes the same changes. Thus, for maximal ratio combining (MRC) at the receiver, the weights are obtained by also using a matched filter on Aux Pilot$_u$.

SUMMARY OF INVENTION

The invention provides an adaptive transmit antenna array having a reduced pilot set. According to the invention, information used to estimate the maximal ratio combining (MRC) weights for an adaptive transmit array is obtained through other than a user-specific pilot. The adaptive transmit antenna array utilizes a decision-directed mechanism for the estimation of the MRC weights to be used at the receiver. This allows an adaptive transmit antenna array to be implemented without requiring a user-specific pilot. Reducing the number of pilot channels in a system results in decreased overhead requirements for the system.

In an embodiment of the adaptive transmit antenna array of the invention, a first and a second signal are each transmitted on a traffic channel from a separate antenna of two antennas. The signals are each weighted by separate weights. The weighting is performed by multiplying each signal by weights that are estimates of the complex conjugate of the channel coefficients. The weights are-the complex conjugate of the channel coefficients in the case of 1-path channels, or they are extracted from the principal eigen vector of the channel correlation matrix in the case of multipath channels. The signals are received at a receiver and demodulated and decoded on a frame-by-frame basis. The signal as received, before demodulation and decoding, is also stored in the receiver. A determination is then made at the-receiver, for each frame, as to whether or not the frame has been correctly decoded. If the frame has been correctly decoded, the frame is processed further by the receiver. If it is determined that the frame has not been correctly decoded, the decoded symbols of the frame are re-encoded and remodulated. The conjugate of the remodulated symbols is then multiplied with the symbols as received on the traffic channel to estimate new weights. The resultant estimate weights are averaged over the period for which the transmit antenna array weighting is constant. These new weight estimates are then used to again demodulate and decode the frames as received on the traffic channel. If no error is detected on the received frame, as decoded using the new weight estimates, the frame is processed further in the receiver. If an error is detected, an error message for the frame is sent to the transmitter.

DESCRIPTION OF THE DRAWINGS

FIG. 2 is a flow diagram showing process steps performed in the transmit adaptive array system of FIG. 1.

DETAILED DESCRIPTION OF THE INVENTION

Figure 1:
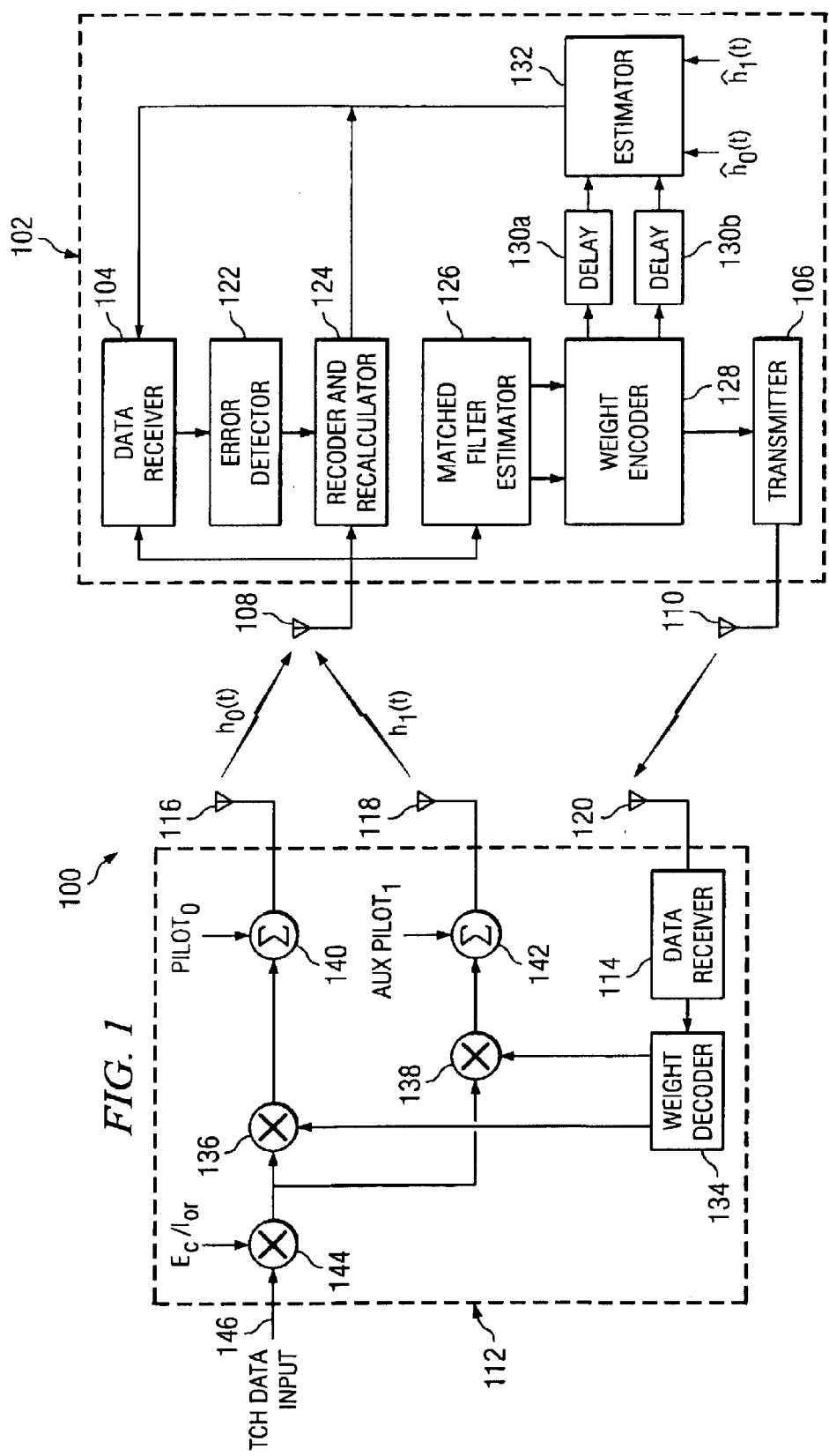
FIG. 1 is a functional block diagram of a transmit adaptive array system according to an embodiment of the invention.

Referring now to FIG. 1, therein is illustrated a functional block diagram showing portions of a transmit adaptive array system according to an embodiment of the invention. System 100 includes base station 112 and mobile station 102. Mobile station 102 includes antenna 108, antenna 110, data receiver (RX) 104, error detector 122, recoder and recalculator 124, matched filter estimator 126, weight encoder 128, delay block 130a, delay block 130b, estimator 132, and transmitter (TX) 106. Base station 112 includes antenna 116, antenna 118, antenna 120, data receiver (RX) 114, weight decoder 134, pilot summer 140, pilot summer 142, channel weighter 136, channel weighter 138, power controller 144, and traffic channel (TCH) data input 146.

System 100 operates according to the embodiment of the invention to provide a transmit adaptive array system that does not require an auxiliary pilot. While shown in the embodiment as base station 112 and mobile station 102, the adaptive array system of the invention may be implemented in any type of code division multiple access (CDMA) communication system in which two transceivers communicate and in which transmit adaptive arrays could be used. In the embodiment of FIG. 1, system 100 is implemented in a system that operates according to the Telecommunications Industry Association/Electronic Industries Association (TIA/EIA)/IS-2000-1 Interim Standard (CDMA2000).

Referring next to FIG. 2, therein is a flow diagram showing process steps performed in the transmit adaptive array system of FIG. 1, according to an embodiment of the invention. Steps 200 to 230 are performed in base station 112 and mobile station 102. While base station 112 and mobile station 102 are shown as particular configurations of functional blocks, it will be understood that the particular functions shown in FIG. 1 and process steps shown in FIG. 2 may be implemented to varying degrees in either hardware or software or both, including processors and memories, in two transceivers that communicate with one another.

In the embodiment, FIG. 2 shows the process as it is performed on one 20 ms. transmission frame that is transmitted from base station 112 to mobile station 102. In the CDMA2000 embodiment, the transmission frame includes 16 groups of 24 symbols each, with each of the 16 groups being weighted by different weights for transmission.

The process begins at step 200. At step 202, the channel response of channels $h_0(t)$ and $h_1(t)$ are estimated in matched filter estimator 126 by applying matched filters on the pilot channels Pilot$_0$ and Aux Pilot$_1$. The channel estimates are done once per symbol. The matched filtering operation for channel estimates to perform the estimation is well known in the art. Matched filter estimator 126 then sends the estimated channel responses $h_0(t)$ and $h_1(t)$ to weight encoder 128. Next, at step 204, weight encoder 128 calculates the weights $w_0(t)$ and $w_1(t)$ for each channel $h_0(t)$ and $h_1(t)$, respectively, from the estimated channel responses. In the embodiment $w_0(t)$ and $w_1(t)$ are amplitude and phase information. The weights are calculated 16 times, once every group of symbols for each frame. The weights are sent to the base station at the same rate, once per group. The weights for one frame may not all be calculated before the frame is transmitted. The calculations are done based on the parts of the frame as they are processed by the mobile before transmission.

At step 206, weight encoder 128 encodes and sends the weights $w_0(t)$ and $w_1(t)$ to transmitter 106 for transmission to base station 112. At base station 112, the encoded weights are received in RX 114, the weight values $w_0(t)$ and $w_1(t)$ are decoded in weight decoder 134, and the decoded weights $W_0(t)$ and $W_1(t)$ are applied in channel weighters 136 and 138, respectively, to weight the relative gain and phase of the signals transmitted on channels $h_0(t)$ and $h_1(t)$. At step 206, weight encoder 128 also sends the weights $w_0(t)$ and $w_1(t)$ to delay blocks 130a and 130b. The delay blocks 130a and 130b are implemented to add a delay, Ta, to the inputting of the weights to estimator 132. Ta is added by delay blocks 130a and 130b to allow an accurate estimation to be made in estimator 132 by causing estimator 132 to estimate the MRC weights based on the estimated channel responses $h_0(t)$ and $h_1(t)$, received from matched filter estimator 126, and the delayed weights $w_0(t-Ta)$ and $w_1(t-Ta)$, from delay blocks 130a and 130b. The delay Ta is set to the delay that is incurred in transmitting the weights $w_0(t)$ and $w_1(t)$ to base station 112 and is calculated as Ta=Tb+Tc, where Tb and Tc are the delays incurred in TX 106 and RX 114, respectively. The estimation of the weights in estimator 132 more closely matches the application of t weights $w_0(t)$ and $w_1(t)$ in base station 112 after being transmitted. Estimator 132 estimates the maximal ration combining (MRC) weights and sends this information to data receiver (RX) 104. The MRC weights are calculated from the channel estimates $h_0(t)$, $h_1(t)$, and the delayed weights $w_0(t-Ta)$ and $w_1(t-Ta)$, as $h_0(t)w_0(t-Ta)+h_1(t)w1(t-Ta)$.

At step 208, data receiver (RX) 104 receives the MRC weights from estimator 132 and receives and decodes the next frame of data, using the weights as sent to the base station 112, for that particular frame of data. Next, at step 210, it is determined if the decoded data frame has an error. If it is determined at step 210 that the data frame does not have an error, the process moves to step 212, and the data frame is processed further in mobile station 102. The process then ends at step 214.

If, however, at step 210, it is determined that the data frame has an error, the process moves to step 216. At step 216, recoder and recalculator 124 recodes and remodulates the data using the same coding and modulation used in base station 112. Next, at step 218, recoder and recalculator 124 compares the recoded and recalculated data with the received data and estimates new weights by using hypothesis testing. Recoder and recalculator 124 performs this as follows: if s(t) is the complex symbol, the received signal is $r(t)=s(t)[h_0(t)w_0(t)+h_1(t)w_1(t)]+noise$. Recoder and recalculator 124 multiplies the received signal by the conjugate of the symbol, to remove the data. Since $s(t) \times conj(s(t))=alpha$, a known constant, $conj(s(t)) \times r(t)=alpha \times [h_0(t)w_0(t)+h_1(t)w_1(t)]+altered$ noise remains after multiplication. Also, the estimates for $h_0(t)$ and $h_1(t)$ are available. Using these, we create $alpha \times [h_0(t)w_0(t)+h_1(t)w_1(t)]$ for all possible combinations of $w_0(t)$ and $w_1(t)$, and compare these with the quantity $conj(s(t)) \times r(t)$. The set $w_0(t),w_1(t)$ that yields the closest comparison to $conj(s(t)) \times r(t)$ is used as the estimate for the weights.

Recoder and recalculator 124 then sends the new weights to data receiver (RX) 104. Data receiver (RX) 104 will again decode the received data using the new weights at step 220 and sends the second decoded data to error detector 122.

Next, at step 222, it is determined in error detector 122 whether or not the second decoded data has an unrecoverable error. If it is determined that the second decoded data does not have an unrecoverable error, the process moves to step 224 where the data is processed further by mobile station 102. If, however, at step 222, it is determined that the data has an unrecoverable error, the process moves to step 228. At step 228, mobile station 102 transmits an unrecoverable error indication for the data frame to base station 112. The process then ends at step 230.

The process of FIG. 2 is performed for each frame transmitted from base station 112 to mobile station 102. If an unrecoverable error indication is sent for a frame at step 228, the system may retransmit the frame according to its retransmission protocol.

Although described in the context of particular embodiments, it will be realized that a number of modifications to these teachings may occur to one skilled in the art. Thus, while the invention has been particularly shown and described with respect to specific embodiments thereof, it will be understood by those skilled in the art that changes in form and shape may be made therein without departing from the scope and spirit of the invention.

What is claimed is:

1. A method for transmitting data in a telecommunication system having a first transceiver and a second transceiver, wherein said second transceiver transmits to said first transceiver on a plurality of channels, each of said plurality of channels transmitted from one of a plurality of antennas, said method comprising the steps of:

determining a first at least one weight for each of the plurality of channels in the first transceiver;

coding, weighting, using said first at least one weight for each of said plurality of channels, and modulating first data in said second transceiver to generate first weighted data;

decoding said first weighted data using said first at least one weight for each of said plurality of channels in said first transceiver to generate first decoded data in the first transceiver;

determining that an error exists in said first decoded data at the first transceiver;

and, in response to a determination that an error exists in said first decoded data:

recoding and remodulating said first decoded data to generate recoded/remodulated data;

estimating a second at least one weight for each of said plurality of channels from said recorded/remodulated data and said first weighted data; and decoding said first weighted data using said second at least one weight for each of said plurality of channels to generate second decoded data at said first transceiver.

2. The method of claim 1, wherein said step of determining a first at least one weight comprises the steps of:

estimating a channel response for each of said plurality of channels;

determining at least one weight for each of said plurality of channels from said channel response, and transmitting said at least one weight for each of said plurality of channels to said second transceiver.

3. The method of claim 1, wherein said step of estimating a second at least one weight for each of said plurality of channels comprises the steps of:

comparing said recoded/remodulated data with said first weighted data; and estimating a second at least one weight for each of said plurality of channels from said comparison.

4. The method of claim 1, wherein said method further comprises the steps of:

determining that an error exists in said second decoded data; and transmitting an error message to said second transceiver in response to determining that an error exists in said second decoded data.

5. A method for receiving data transmitted on a plurality of channels, each of said plurality of channels transmitted from one of a plurality of antennas, to a first transceiver in a telecommunication system, said method comprising:

determining a first at least one weight for each of the plurality of channels in the first transceiver;

transmitting said first at least one weight for each of the plurality of channels from the first transceiver to a second transceiver;

receiving first weighted data at said first transceiver, said first weighted data transmitted from said second transceiver after coding, weighting, using said first at least one weight for each of said plurality of channels, and modulating in said second receiver;

decoding said first weighted data using said first at least one weight for each of said plurality of channels in said first transceiver to generate first decoded data in the first transceiver;

determining that an error exists in said first decoded data; and, in response to a determination that an error exists in said first decoded data:

recoding and remodulating said first decoded data to generate recoded/remodulated data;

estimating a second at least one weight for each of said plurality of channels from said recoded/remodulated data and said first weighted data; and decoding said first weighted data using said second at least one weight for each of said plurality of channels to generate second decoded data.

6. The method of claim 5, wherein said step of determining a first at least one weight comprises the steps of:

estimating a channel response for each of said plurality of channels; and determining at least one weight for each of said plurality of channels from said channel response.

7. The method of claim 5, wherein said step of estimating a second at least one weight for each of said plurality of channels comprises the steps of:

comparing said recoded/remodulated data with said first weighted data; and estimating a second at least one weight for each of said plurality of channels from said comparison.

8. The method of claim 5, wherein said method further comprises the steps of:

determining that an error exists in said second decoded data; and transmitting an error message to said second transceiver in response to determining that an error exists in said second decoded data.

9. An apparatus for transmitting data in a telecommunication system, said apparatus comprising:

a transceiver comprising:

a first receiver for receiving transmissions including first weighted data on a plurality of channels;

a decoder coupled to said first receiver, said decoder for decoding said first weighted data using a first at least one weight for each of said plurality of channels in said transceiver to generate first decoded data in the transceiver, said decoder further for decoding said first weighted data a second time using a second at least one weight for each of said plurality of channels in response to receiving a control signal;

an error detector coupled to said decoder, said error detector for determining that an error exists in said first decoded data and generating an error signal;

a recoder and remodulator coupled to said decoder, said recoder and remodulator for recoding and remodulating, in response to an error signal being generated in said error detector, said first decoded data to generate recoded/remodulated data; and an estimator coupled to said recoder and remodulator, said recoder and remodulator for estimating said second at least one weight for each of said plurality of channels from said recoded/remodulated data and said first weighted data, said estimator further for generating swaid control signal in response to estimating said second at least one weight and sending said control signal to said decoder.

10. The apparatus of claim 9, wherein said transceiver comprises a first transceiver, sand said apparatus further comprises a second transceiver, said second transceiver for transmitting to said first transceiver on said plurality of channels, and wherein said first transceiver further comprises:

an estimator coupled to said first receiver, said estimator for estimating a channel response for each of said plurality of channels;

a determiner coupled to said estimator, said determiner for determining at least one weight for each of said plurality of channels from said channel response; and a transmitter coupled to said determiner, said transmitter for transmitting said at least one weight for each of said plurality of channels to the second transceiver.

11. The apparatus of claim 10, wherein said second transceiver comprises:

a second receiver for receiving said at least one weight for each of said plurality of channels from said first transceiver;

an encoder coupled to said second receiver, said encoder for encoding first data to generate encoded data;

a modulator coupled to said encoder, said modulator for modulating said encoded data to generate modulated data; and a channel weighter coupled to said modulator, said channel weighter to weight said modulated data to generate said first weighted data.

12. The apparatus of claim 9, wherein said estimator estimates said second at least one weight from said plurality of channels by comparing said recoded/remodulated data with said first weighted data and estimates a second at least one weight for each of said plurality of channels from said comparison.

13. The apparatus of claim 9, wherein said error detector further determines whether an error exists in said second decoded data, and, if an error exists, transmits an error message to said second transceiver.

* * * * *